US011293477B2

(12) United States Patent
Goeders

(10) Patent No.: US 11,293,477 B2
(45) Date of Patent: Apr. 5, 2022

(54) WASHER FOR SECURING SPHERICAL AND CYLINDRICAL OBJECTS

(71) Applicant: Jon Jay Goeders, Kirkwood, MO (US)

(72) Inventor: Jon Jay Goeders, Kirkwood, MO (US)

( * ) Notice: Subject to any disclaimer, the term of this patent is extended or adjusted under 35 U.S.C. 154(b) by 306 days.

(21) Appl. No.: 16/599,208

(22) Filed: Oct. 11, 2019

(65) Prior Publication Data

US 2021/0108673 A1 Apr. 15, 2021

(51) Int. Cl.
*F16B 43/00* (2006.01)

(52) U.S. Cl.
CPC .................................. *F16B 43/00* (2013.01)

(58) Field of Classification Search
CPC .......... F16B 33/00; F16B 39/10; F16B 39/24; F16B 43/00
USPC ........ 411/337, 352–353, 368, 370, 372, 531, 411/533, 541, 546
See application file for complete search history.

(56) References Cited

U.S. PATENT DOCUMENTS

| | | | | |
|---|---|---|---|---|
| 2,980,453 A * | 4/1961 | Nesson | ................. | B60S 1/3418 403/281 |
| 3,212,387 A * | 10/1965 | Madansky | ................ | F16B 5/02 411/371.2 |
| 3,761,867 A * | 9/1973 | Churla | ..................... | H01R 4/26 439/413 |
| 3,911,706 A * | 10/1975 | Davis | ..................... | B21D 26/14 72/56 |
| 5,069,589 A * | 12/1991 | Lemke | .................... | E04D 5/145 411/533 |
| 5,915,903 A * | 6/1999 | Osterle | .................. | E04D 5/142 411/531 |
| 6,234,736 B1 * | 5/2001 | Miescher | ............. | E04B 1/7633 411/480 |
| 2006/0088398 A1 * | 4/2006 | Lund | .................... | F16B 5/0225 411/155 |
| 2010/0272538 A1 * | 10/2010 | Yoshida | ................ | F16B 1/0014 411/368 |
| 2014/0377032 A1 * | 12/2014 | Delcher | ................. | F16B 39/28 411/149 |
| 2016/0160904 A1 * | 6/2016 | Lee | ........................ | F16B 39/282 411/332 |

* cited by examiner

*Primary Examiner* — Roberta S Delisle
(74) *Attorney, Agent, or Firm* — Zarley Law Firm, P.L.C.

(57) ABSTRACT

A washer or spacer has a base with a central opening and a plurality of studs or teeth that surround the central opening. The teeth are transverse or perpendicular in relation to the base. The teeth adjacent an outer perimeter of the base are longer than the teeth adjacent the central opening.

7 Claims, 2 Drawing Sheets

WASHER FOR SECURING SPHERICAL AND CYLINDRICAL OBJECTS

BACKGROUND OF THE INVENTION

The present invention is directed to a washer and more particularly to a washer adapted for use with arcuate objects having a spherical or cylindrical shape.

Washers are well-known in the art and typically have two purposes. First, a washer is used to distribute pressure of the nut evenly over the surface so that the surface isn't damaged. Second, washers are used to ensure that the nut is pressed against a smooth surface reducing the chance that the nut will eventually loosen because of contact with an uneven surface. While useful, washers are not particularly well-suited for use with arcuate objects. Accordingly, a need exists in the art for a washer that addresses this and other deficiencies.

An objective of the present invention is to provide a washer adapted to hold a spherical object.

Another object of the present invention is to provide a washer adapted to hold a cylindrical object.

These and other objectives will be apparent to those having ordinary skill in the art based upon the following written description, drawings, and claims.

SUMMARY OF THE INVENTION

A washer or spacer has a base with a central opening. Extending away from the base either perpendicularly or transversely are a plurality of teeth or studs. The teeth adjacent an outer perimeter of the base are longer than the teeth adjacent the central opening. In one embodiment the teeth are aligned in rows wherein the closer the rows are to the central opening the shorter they are compared to rows spaced farther away.

DETAILED DESCRIPTION OF THE PREFERRED EMBODIMENTS

Figure 1:
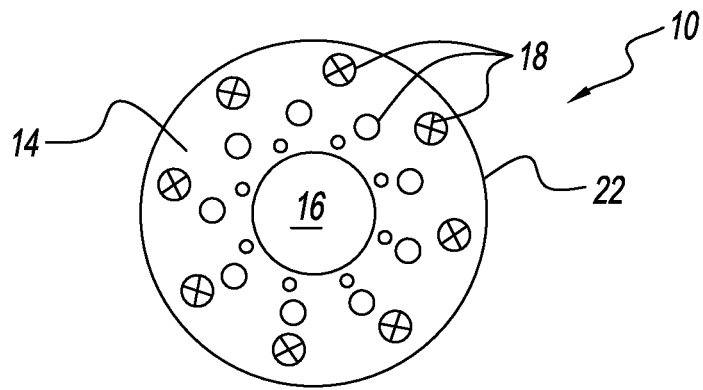
FIG. 1 is a bottom plan view of a washer.
Figure 4:
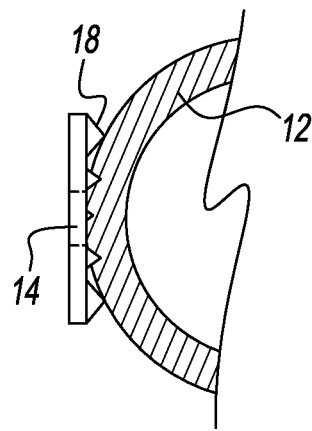
FIG. 4 is a side view of a washer and spherical object.

Referring to the Figures, a washer or spacer 10 for spherical, cylindrical, or arcuate objects 12 generally has a base 14 with a central opening 16. Surrounding the central opening 16, and extending transversely away from the base 14 are a plurality of studs or teeth 18. The teeth 18 are of any size, shape, and structure and preferably taper inwardly as they extend from the base to a point 20. For grasping a spherical object 12, the point 20 of teeth 18 positioned adjacent an outer perimeter 22 of the base 14 extend farther away from the base 14 than the teeth 18 positioned adjacent the central opening 16. As a result, the point 20 of the teeth 18 form a concave side profile that curves inwardly from the outer teeth (i.e. adjacent outer perimeter 22) to the inner teeth (i.e. adjacent central opening 16). Here, FIG. 1 relates to FIG. 4.

Figure 2:
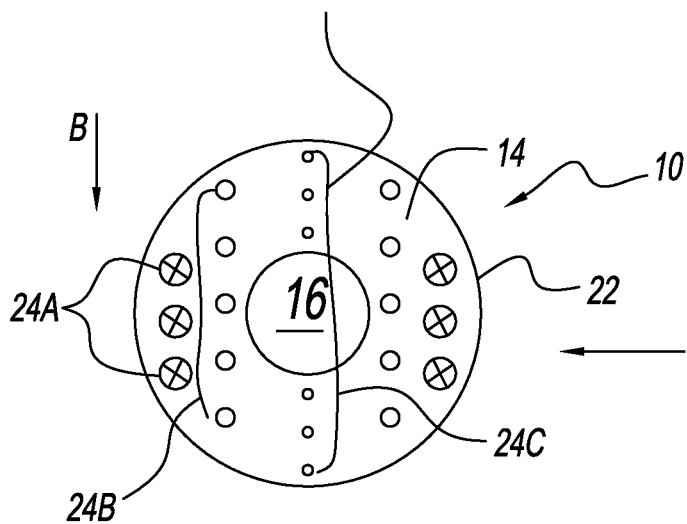
FIG. 2 is a bottom plan view of a washer.
Figure 3:
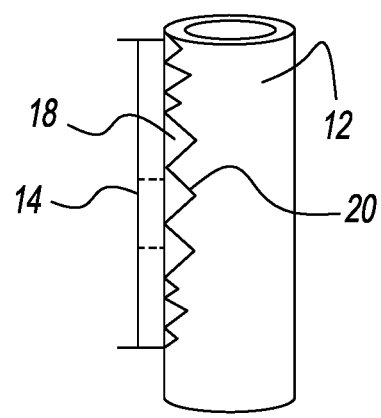
FIG. 3 is a side view of a washer and a cylindrical object.

For grasping a cylindrical object 12 the teeth 18 are aligned in a plurality of rows 24. The teeth 18 in the outer rows 24A are longer than the next adjacent row 24B of teeth 18, which are longer than the next row 24C of teeth 18 as the rows 24 move from the outer perimeter 22 to the central openings 16. The gradual reduction of the length of the teeth 18 forms a partial groove adapted to receive and grasp a cylindrical object 12. In some embodiments, the washers are magnetized. Here, FIG. 2 relates to FIG. 3.

Figure 5:
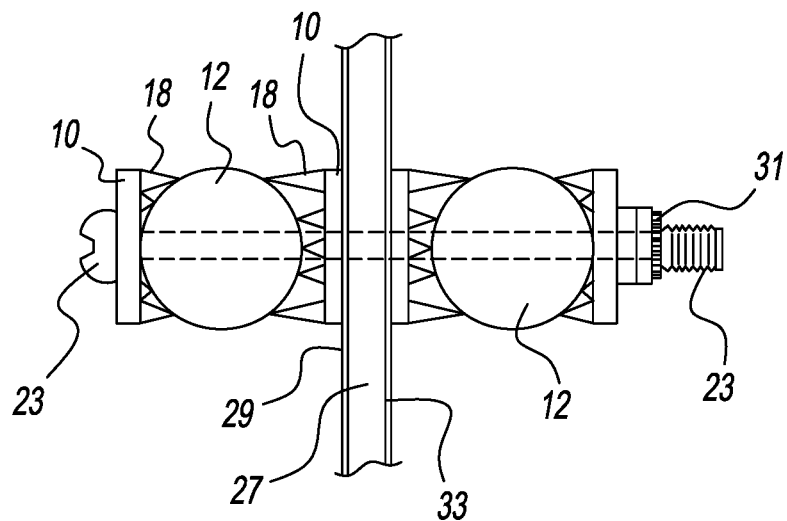
FIG. 5 is a side view of washers in an assembly.
Figure 6A:
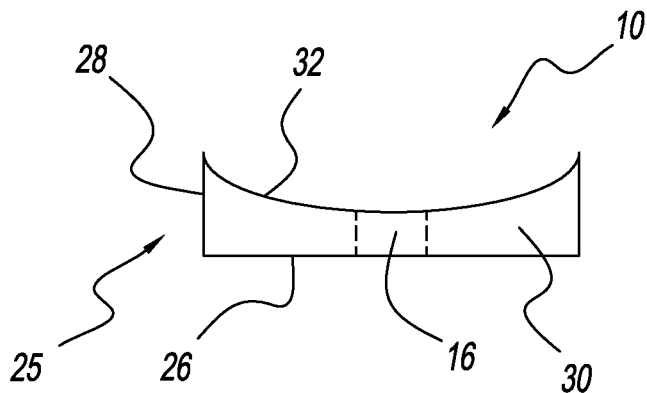
FIG. 6A is a side view of a washer.
Figure 6B:
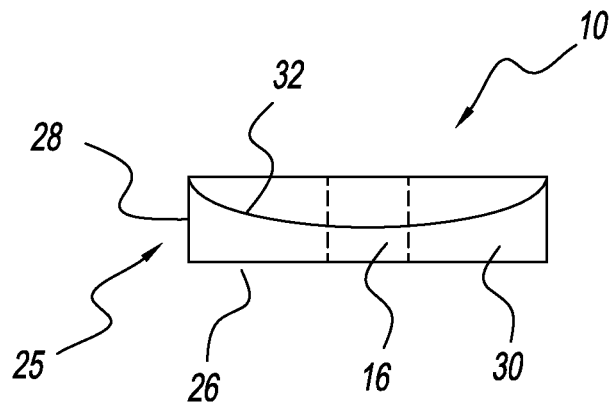
FIG. 6B is a side view of a washer.

In operation, an object 12 is placed between a pair of washers 10 and received by the teeth 18 of the washers 10. A bolt or screw 23 is inserted through the central opening 16 of a first washer 10, then through the object 12, and again through the central opening 16 of the second washer 10. From there, the bolt or screw 23 extends through a support object 27 having a first flat surface 29. A nut 31 is applied to the screw or bolt 23 and tightened to engage a second surface 33 of the support object. Alternatively, a serial connection with multiple objects can be made as shown in FIG. 5.

In an alternative embodiment the spacer 10 having an elongated or squared body 25 having a flat outer surface 26, side walls 28, end walls 30, and a smooth arcuate concave inner surface 32. A central opening 16 extends through the spacer 16 from the outer surface 26 to the inner surface 32. The spacer 10 is attached to an object 12 as previously described.

Accordingly, a washer/spacer has been disclosed that at the very least meets the stated objectives.

From the above discussion and accompanying figures and claims it will be appreciated that the washer or spacer 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A washer comprising:
   a base having a central opening;
   a plurality of teeth that surround the central opening and extend transversely away from the base;
   wherein the plurality of teeth adjacent an outer perimeter of the base extend farther away from the base transversely than the plurality of teeth adjacent the central opening.

2. The washer of claim 1 wherein the washer is magnetized.

3. The washer of claim 1 wherein the teeth are in concentric arrangement in relation to the central opening.

4. A washer, comprising:
   a base having a central opening;
   a plurality of teeth that surround the central opening and extend transversely away from the base;
   wherein the plurality of teeth are aligned in adjacent rows.

5. The washer of claim 4 wherein the plurality of teeth in an outer row are longer than the plurality of teeth in a row closer to the central opening.

6. The washer of claim 4 wherein the washer is magnetized.

7. The washer, comprising:
   an elongated or squared body having a flat outer surface, side walls, end walls, and a smooth arcuate concave inner surface or grooved inner surface; and a central opening that extends through the washer from the flat outer surface to the smooth arcuate concave inner surface.

\* \* \* \* \*